US006963741B2

(12) United States Patent
Johansson et al.

(10) Patent No.: US 6,963,741 B2
(45) Date of Patent: Nov. 8, 2005

(54) METHOD AND A DEVICE IN A CELLULAR RADIO SYSTEM

(75) Inventors: Lars Johansson, Linköping (SE); Walter Müller, Upplandsväsby (SE)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 817 days.

(21) Appl. No.: 09/835,229

(22) Filed: Apr. 13, 2001

(65) Prior Publication Data

US 2001/0051520 A1    Dec. 13, 2001

(30) Foreign Application Priority Data

Apr. 17, 2000    (SE) .................................... 0001423

(51) Int. Cl.$^7$ ............................. H04Q 7/20; H04Q 7/34
(52) U.S. Cl. .................... 455/423; 455/424; 455/425; 455/67.11; 455/453; 455/450; 455/422.1; 370/235; 370/237; 370/248; 370/250
(58) Field of Search .................... 455/422.1, 450–453, 455/500, 509, 512, 511, 403, 414.1, 550.1, 455/405, 423, 424, 426.1, 426.2, 445, 446, 455/9, 517, 67.11, 67.12, 73, 560, 561.1; 370/235, 237, 248, 250

(56) References Cited

U.S. PATENT DOCUMENTS 5,684,793 A    11/1997  Kiema et al. ............... 370/335
5,862,485 A *  1/1999  Linneweh et al. .......... 455/450
6,192,248 B1 * 2/2001  Solondz ...................... 455/450
2002/0065082 A1 * 5/2002  Yegani et al. ............... 455/452
2003/0069035 A1 * 4/2003  Shurvinton ................. 455/522

FOREIGN PATENT DOCUMENTS

WO    98/48530    10/1998
WO    99/16185     4/1999

OTHER PUBLICATIONS

International-Type Search Report prepared in connection with SE 0001423-3 by the Swedish Patent Office and completed on Oct. 18, 2000.

* cited by examiner

Primary Examiner—Keith Ferguson (57) ABSTRACT

A method and device for controlling resources to avoid congestion in a cellular radio system having a mobile terminal connectable to a network via one or more base stations. When the mobile terminal sends an uplink signal, each base station receives a different uplink signal due to different radio paths between the mobile terminal and the base station. A resulting signal corresponding to the uplink signal sent from the mobile terminal is derived from the received signals, and the importance of each received signal to the resulting signal is determined. If there is a shortage or a projected shortage of resources to handle current or projected traffic demand in the base station, downlink radio links from the base station to the mobile terminal are prioritized according to the determined importance of each received uplink signal, and resources are freed from lower priority downlink radio links to avoid congestion.

20 Claims, 4 Drawing Sheets

METHOD AND A DEVICE IN A CELLULAR RADIO SYSTEM

TECHNICAL FIELD OF THE INVENTION

The present invention relates to a method for handling resources in purpose to avoid congestion in a cellular radio system, comprising at least one mobile terminal connectable to a network via at least one base station.

It also relates to a device in a cellular radio system, the system comprising at least one mobile terminal connectable to a network via at least one base station, the at least one base station being connected to the network via at least one node.

Furthermore it relates to a node in a network in a cellular radio system, the node being connectable to at least one base station, which can connect to and receive uplinks from at least one mobile terminal, the node being adapted to receive these uplinks from the base stations connected to the node in a receiving means and derive in a deriving means a resulting signal from the uplinks originating from the same mobile terminal.

The invention also relates to a base station in a cellular radio system, the base station being connected to a network and connectable to at least one mobile terminal.

It relates as well to a mobile communication network comprising at least one base station.

RELATED ART

Code Division Multiple Access (CDMA) is a multiple access method that is based on spread spectrum technique. It is applied in cellular radio systems in addition to the FDMA (Frequency Division Multiple Access) and TDMA (Time Division Multiple Access) methods. In the CDMA method the narrow-band data signal from the user is multiplied to a relatively wide band by means of a spreading code. The CDMA technique enables all users to transmit on the same frequency simultaneously. A separate spreading code is used for each connection between a base station and a mobile station, and the signals of the different users can be distinguished from one another in the receivers on the basis of the spreading code of each user. The data signal is restored in the receiver to the original band by multiplying it again by the same spreading code that was used during the transmission. To avoid the signals disturbing each other the codes allocated to the downlinks (radio links from base station to mobile terminal) from each base station are typically, mutually orthogonal.

The number of orthogonal codes is however limited and the number is dependent on the data rate. When the average used data rate increases in a cell the number of available orthogonal codes decreases.

Thus, a base station has limited resources regarding codes that can be used in the downlink direction. The base station may also have limited resources regarding the total amount of transmitted power and regarding the signal processing resources required for transmitting and receiving.

This means that when there are many mobile terminals in the same area a lack of resources could arise in the base station working in this area. This lack of resources may cause quality degradation, connection breaks and perhaps also dropped calls. There could for example be a lack of power or a lack of codes. A lack of power is a momentary occurrence. It arises thus quickly and could have a very short duration. There may be several reasons for a shortage of base station power. For example a shortage of power could arise when a large portion of the mobile terminals connected to a base station experiences high levels of downlink interference, gets out of coverage or uses high data rates. These variations in output power from a base station cell are only possible to predict by statistical means. A shortage of codes could also be predicted by statistical calculations. The prediction is easier when it comes to a lack of codes since the locations of the mobile terminals inside the cells do not affect the number of used codes.

In WO 97/08911 the inventor tries to solve the limited power resources problem. The document discloses a handover method in a cellular radio system. According to this method a lack of power is handled by the subscriber terminal which controls the downlink transmission of one or several base stations in such a way that each base station either switches its transmission on or off or decreases the transmission power. In this method the subscriber terminal thus controls the amount of used power.

One problem that is not taken care of by this method is that the mobile terminal only has knowledge based on estimated quality on received downlink pilot signal strength and no knowledge about the power situation in the base station. Accordingly, if a branch is selected by the mobile terminal to be the only branch for this connection and this branch is impossible to use due to power or code limitations, the connection may be broken.

SUMMARY

The object of the invention is to increase the reliability of connections in a cellular radio system.

This is achieved by a method of the initially defined kind, comprising the steps described hereafter. The first step is the receiving in the at least one base station of a signal sent from a mobile terminal, the receiving in different base stations corresponding to different radio paths (uplinks) of the signal. After the receiving a resulting signal corresponding to the signal sent from the mobile terminal is derived from these uplinks. The importance of each uplink to the resulting signal is then determined and according to the determination it is decided which downlinks that should be given less power or be removed if there is, or is about to be, a shortage of resources, in purpose to free resources. The last step of this method is to control the power of the decided downlinks if there is, or is about to be, a shortage of resources.

It is also achieved by a device of the initially defined kind wherein the device is adapted to control the power of downlinks between a base station and the at least one mobile terminal when there is, or is about to be, a shortage of resources in the base station in purpose to free resources. The device is adapted to be placed in the base station and comprises receiving means adapted to receive information about how important the different uplinks coming into the base station from different mobile terminals are to the total signals, which are derived in the node from uplinks originating from the same mobile terminal. It comprises also decision means connected to the receiving means adapted to decide locally in the base station according to the information received from the node which downlinks that should be given less power or be removed if there is, or is about to be, a shortage of resources in the base station. Further it comprises a power controlling means connected to the decision means adapted to control the power for the decided downlinks in case of a shortage of resources.

The object of the invention is furthermore achieved by a node of the initially defined kind comprising determination means adapted to determine the importance of each received uplink to the resulting signals. The node comprises also informing means connected to the determining means adapted to inform each base station concerned about this determination.

It is as well achieved by a base station of the initially defined kind comprising such a device.

It is also achieved by a mobile communication network of the initially defined kind wherein the base stations each comprises such a device and the base stations being connected to the network through such a node.

This method, device, node, base station and mobile communication network allow each base station to make a local decision regarding which downlinks should be removed in order to free resources. To make the decision the base station uses the information from the node, usually a RNC (Radio Network Controller), in the network connected to the base stations regarding the importance of each uplink received in the base station. The RNC has the best knowledge about which uplink branches that are important to the total derived signal since it collects the uplinks from the base stations and derives a resulting signal from them corresponding to the originally signal sent from the mobile terminal.

Preferably the method comprises deciding in the decision means according to the determination how the signal processing resources should be distributed for the receiving of different uplinks; and controlling, according to the decision, in receiving resources controlling means, the signal processing resources for the receiving of different uplinks. This enables control of receiving resources in addition to the control of transmitting resources described above.

Preferably the deriving and determining steps are carried out in at least one node in the network, the node being connected to the at least one base station and the deciding and the controlling are carried out in each base station.

Suitably the method comprises informing the at least one base station about the importance of each uplink to the resulting signal and receiving the information from the node in each base station.

It is advantageous that the controlling also includes reallocation of codes for down-links that have been removed to new connections if there is, or is about to be, a lack of codes. This reallocation is suitably performed by the controlling means. Then the utilising of the available codes is made more effective.

Preferably the informing and receiving of information also includes informing from the informing means in the node and receiving in the receiving means in the base station information about which codes that are used for the connections and/or about which downlinks from the different base stations that are most important for the resulting signal in the mobile terminal. This additional information is considered when making the decision in the decision means in the base stations of which downlinks that should be given less power or be removed if there is or is about to be a shortage of resources, in purpose to free resources. Since the mobile terminal informs the RNC about the received quality of pilot signals broadcasted from each base station the RNC also has knowledge about the downlink conditions. This information about downlink quality is forwarded from the RNC to the base stations such that the base stations can use also this information when making a decision of which downlinks that should be given less power in case of a lack of resources. This additional information about downlink quality and about codes contributes to a more correct decision in the base station about which downlink that should be given less power or be removed in case of a lack of resources.

Suitably the information received in the receiving means in the base stations from the informing means in the node is received in a header of a packet, the packet containing the payload for each connection respectively.

In one embodiment of the invention the needed information is sent from the information means in the node and received in the receiving means in the base stations as an answer to every signal sent to the node from the base stations. Then the pieces of information preferably is combined in a combining means and evaluated in an evaluating means in the base station.

It is advantageous that the deriving from the uplinks of a resulting signal corresponding to the signal sent from the mobile terminal is performed by combining the different uplinks into one signal in the deriving means in the node. Then enhanced quality of the signal is gained thanks to diversity.

Preferably the receiving means in the node is adapted to receive information about pilot signal measurements made in the mobile terminals. This information provides knowledge to the node about the quality of the different downlinks. Hereby the node has a more complete knowledge about the quality of different branches.

Preferably the node is a Radio Network Controller (RNC).

BRIEF DESCRIPTION OF THE DRAWINGS

FIG. 3 shows a node, RNC, in the telephone network and how it is connected to the base stations in FIG. 1. FIG. 3 is also an illustration of a first embodiment of the invention.

DETAILED DESCRIPTION OF EMBODIMENTS

In a CDMA-system mobile terminals receive and combine branches from many base stations at the same time. This is possible since different base stations use the same frequency for their branches to one and the same mobile terminal. In the following description each base station corresponds to one cell.

Figure 1:
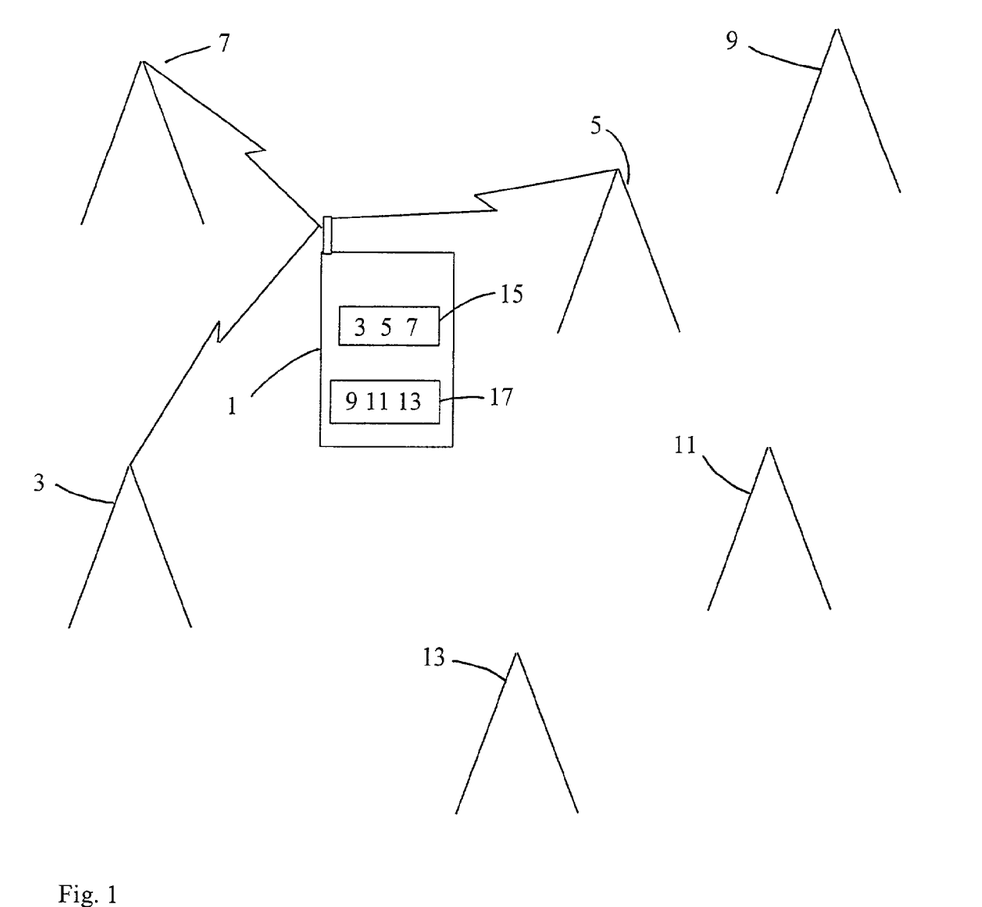
FIG. 1 shows schematically a mobile terminal, which is in contact with three base stations.

FIG. 1 shows schematically a mobile terminal 1, which has established radio links to a first, a second and a third base station 3,5 and 7, respectively. There is also shown a fourth, a fifth and a sixth base station 9,11 and 13, respectively. They have not established radio links to the mobile terminal 1.

The mobile terminal 1 has an active set 15 of base stations 3,5,7 from which the mobile terminal 1 receives radio signals and a monitored set 17 of base stations 9,11,13 from which the mobile terminal 1 should be ready to receive radio signals. The mobile terminal 1 receives a pilot signal from all base stations in a region around the mobile terminal, this region comprising both the active set 15 and the monitored set 17.

Pilot signals are used in the CDMA system to estimate the quality of the downlinks from the base stations. A pilot signal is a data-unmodulated spreading-coded signal, which is continuously transmitted by each base station to its coverage area. A rake receiver (not shown) in a mobile terminal indicates when it has received power on a specific code corresponding to a pilot signal from a specific base station. The mobile terminal receives these pilot signals from the base stations and reports measurement values to a node, RNC, in the network connected to the base stations. The node uses the pilot signal measurements to instruct the mobile terminal to receive or not receive downlinks from the different base stations. The pilot signals giving the strongest measurement values form the active set 15 of the base stations 3,5,7 in the mobile terminal. From the base stations 9,11,13 comprised in the monitored set 17 the mobile terminal 1 receives nothing but these pilot signals.

The rake receiver in each mobile terminal continuously measures pilot signals. Each rake receiver maintains a measurement list of the base stations and the corresponding spreading codes of the pilot signals that are situated near the mobile terminal and that are possible candidates for handover or connection establishment. The base stations on the measurement list form a group of candidates, which may become members of the active set.

When a mobile terminal moves, the measurement list is updated. The rake receiver receives radio signals from a new base station when the RNC instructs the mobile terminal to do so. The instructions from the RNC are based on the strengths of the, in the mobile terminal, received pilot signals.

The mobile terminal repeatedly sends information to the base stations about for example, how strong the different received pilot signals are. This information could be sent periodically or only when a change in the signal has been recorded. The information is forwarded from the base stations to the RNC (Radio Network Controller). The RNC knows also the sending effect of the pilot signals and thus it knows the attenuation between the base station and the mobile terminal for each downlink (radio links from the base stations to the mobile terminals). It can thus from this information derive which downlinks that are most important in the different connections.

Accordingly, in FIG. 1, the base stations 3,5,7 in the active set 15 are located "close" to the mobile terminal 1 and the base stations 9,11,13 in the monitored set 17 are located "next" to the active set base stations. This "close" and "next" corresponds rather to the needed power for a good connection than to a geographical distance. When the mobile terminal moves some of the monitored set base stations 9,11,13 are moved from the monitored set 17 to the active set 15 and vice versa. Both sets 15,17 are thus currently updated as the mobile 1 moves between the cells of the base stations.

Figure 2:
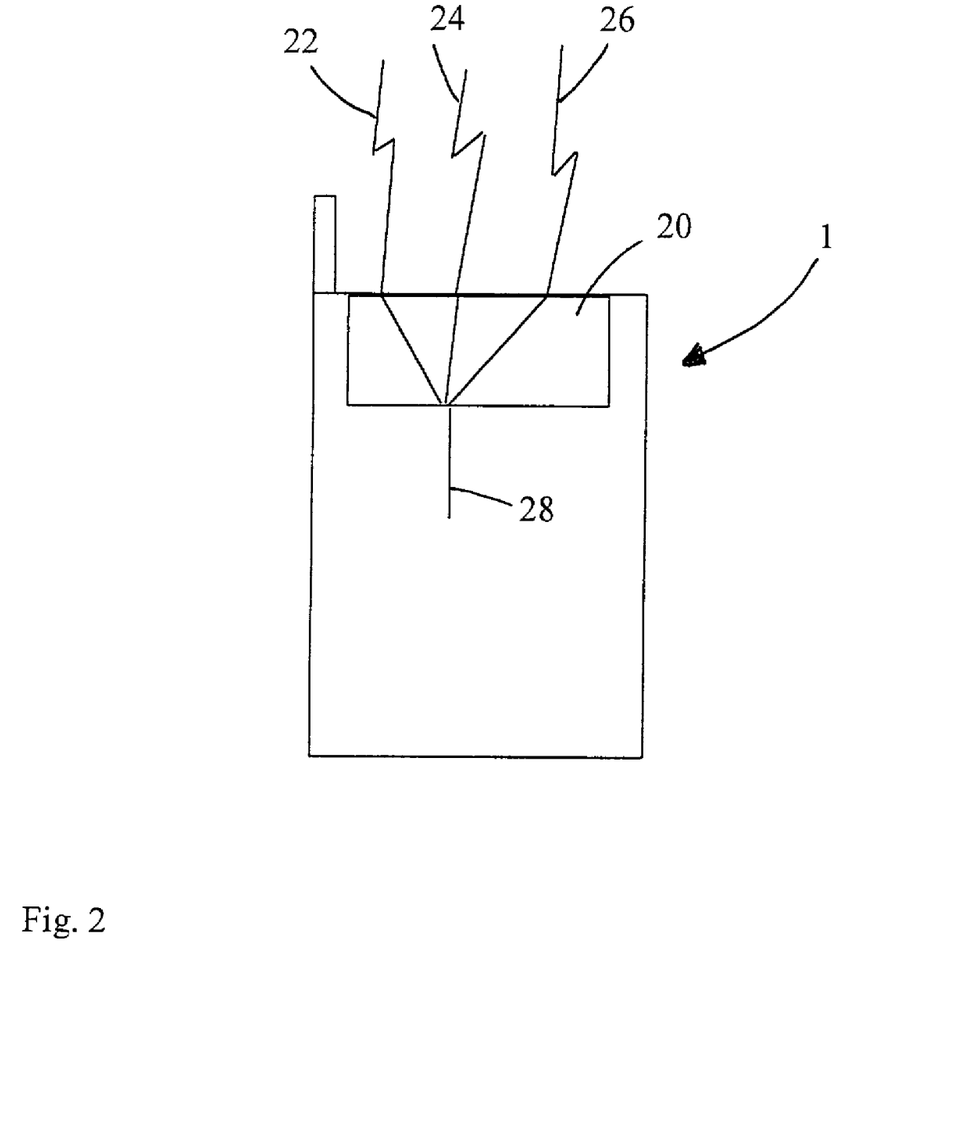
FIG. 2 shows schematically the mobile terminal in FIG. 1.

FIG. 2 shows schematically the mobile terminal 1 in FIG. 1. The mobile terminal 1 comprises a rake receiver 20. A similar device is placed in all mobile terminals and also in each base station. The rake receiver 20 receives radio signals 22,24 and 26, respectively, from the base stations 3,5 and 7, respectively, (see FIG. 1) that are comprised in the above-mentioned active set 15. These signals 22,24,26 have each different codes. The rake receiver 20 decodes the signals 22,24,26 and combines them into one signal 28. The fact that the end signal 28 is combined from many signals 22,24,26 gives an increased signal quality thanks to diversity. The signal from one base station is also divided into many radio paths during the transmission between the base station and the rake receiver due to reflections. The different radio paths will propagate along different paths and thus they will arrive at the rake receiver 20 in different times. The rake receiver 20 combines also these radio paths and quality in the connection is once again gained because of diversity.

Figure 3:
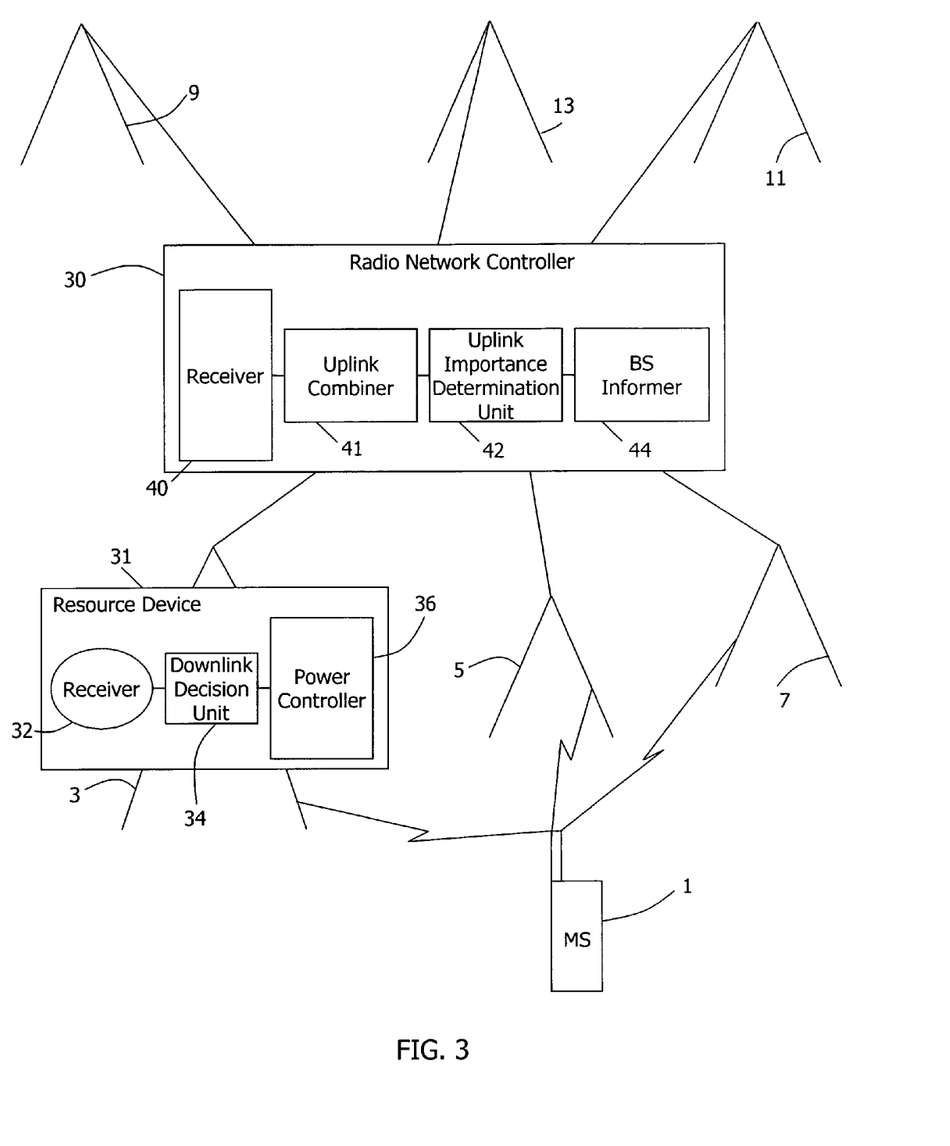

FIG. 3 shows a node, RNC (Radio Network Controller) 30, in the telephone network and how it is connected to the first, second, third, fourth, fifth and sixth base stations 3,5,7,9,11,13 in FIG. 1. The mobile terminal 1 shown in FIG. 3 emits a signal, which is received in the three "closest" base stations 3,5,7. The signal has travelled along different radio paths to the different base stations 3,5,7 and thus the signal quality could differ. The RNC 30 combines then the different uplinks of the signal received in the first, second and third base stations 3,5,7. Quality of the resulting signal is gained thanks to diversity.

A lack of resources can arise in a base station. It could be a lack of power or a lack of codes. A lack of codes means that there are so many connections that the number of orthogonal codes is not sufficient. However, if there are many connections using a high data rate a lack of codes can occur even if there are not so many branches since high data rate codes are few.

In the case of a lack of resources in a base station one or more downlinks from this base station to different mobile terminals has to be given less power or be removed. If there is a lack of codes the code for the removed downlink should be reallocated for a new connection. This decision about how to free resources has to be quick and according to the invention the decision should be taken locally in the base station and it should rely on information sent to the base station from the RNC.

There are different possibilities for the transmission of data, such as voice, text and information from the RNC 30 to the base stations 3,5,7,9,11,13 and vice versa. One example is that a packet with data is sent whenever there is data to be sent. Another example is that packets with data are sent continuously between the base stations and the RNC, for example every 20 ms, no matter if there is data to be sent. According to the invention the RNC informs the base stations about the importance of different branches. One way of informing is to send some information in a header together with the data in the packet from the RNC to the base stations. This information could for example be information about how important this particular base station, to which the packet is going, is for the receiving of the signal from the mobile terminal concerned.

The information sent from the RNC to the base stations could, beside the mentioned information about how important each branch in the uplink (from the mobile terminals to the base stations) is for a resulting signal combined in the RNC, contain information about how important each branch in the downlink (from the base stations to the mobile terminals) is for the resulting signal in the mobile terminal. This is possible since the mobile terminals send information about for example measurements of the pilot signals to the RNC through the base stations in measurement report messages.

Information about the uplinks known in the base stations, for example interference of the uplinks, can be sent to the RNC from the base stations, in either a packet header or as a separate message. The RNC has also knowledge about codes used for the connections. This code information and uplink and downlink information is, according to one embodiment of the invention, forwarded in any suitable combination from the RNC to the base stations in a header of a packet. Either the RNC forwards just the plain information or a mean value of the importance according to this information over a certain time period. If packets are sent continuously it is possible that the RNC sends information of the importance back to a base station for every received data packet from the base station. This implies that the base station has to combine and evaluate all pieces of information to get a correct judgement of what to do to save resources. The information is then used in the base stations to decide locally for example which downlinks that should be given less power or how the signal processing resources for the receiving of different uplinks should be distributed in case of a shortage of resources.

Another method for informing the base stations of the importance of different branches is to provide each data packet that is sent to the base stations with a value telling how important it is that this data is forwarded to the mobile terminal. The value is thus based on the information of the uplinks, downlinks and codes that is available in the RNC. The base station may then calculate from these values the importance of each branch. Still another method is to not send data at all from the RNC to branches that are unnecessary for the total signal. The RNC still uses the information about uplinks, downlinks and codes or one or two of them to decide which branches that are not so important. The base station may then from the amount of received data estimate the importance of each branch and in the case of a shortage of power use this estimation when choosing which branch that should be given less power. However, if a base station receives nothing from the RNC it is important that the base station does not transmit anything to the mobile terminal since this "nonsense signal" if sent would disturb the real signal. This is described in a copending U.S. patent application Ser. No. 09/042359 filed Mar. 13, 1998.

Still another method is to let the base station count the number of faulty signal blocks it has received from a mobile terminal and to let the RNC inform the base station if there are more than one base station connected to the mobile terminal and perhaps about downlink conditions. If there are more than one base station connected and the base station receives many faulty blocks the base station can decide by itself to decrease the power to a downlink.

With this information about both uplink and downlink conditions and also about codes, that in some way is sent to the base stations from the RNC in different combinations, the base stations can make a correct decision about how to save resources. For example a branch with little importance to the signal quality could be given less power or maybe be removed. And if there is a lack of codes the code used for the branch that has been removed should be reallocated to a new connection.

If the condition of a branch is changed and no data is going to be sent from the RNC to the base station concerned, i.e. no packet is going to be sent, there is a possibility to send packets without data, just containing the needed information in a header.

There are as already mentioned different possibilities for the RNC to inform the base stations of the conditions of the different branches. One is that the RNC sends information to the base stations every time a packet is sent. In this case the base station needs to combine and evaluate these pieces of information by itself. Another possibility is that the RNC collects information about the different branches from the base stations and the mobile terminals for a certain time period and combines it to a judgement of the importance of the different branches to be sent to the base stations.

All combinations of these mentioned variants are of course possible.

In a first embodiment of the invention, shown in FIG. 3, the RNC 30 comprises receiving means 40 adapted to receive uplinks from the base stations and measurement reports on the pilot signal measurements from the mobile terminals. The receiving means 40 is connected to a deriving means 41 adapted to derive a resulting signal from the incoming uplinks from the base stations. In this embodiment the deriving means 41 combines the uplinks to acquire a signal of good quality. The RNC comprises also determination means 42 connected to the deriving means 41. The determination means 42 is adapted to determine the importance of each received uplink to the resulting signals. The RNC also comprises informing means 44 connected to the determination means 42 adapted to inform each base station concerned about for example this determination. The information comprises in this embodiment information about the quality of the uplink in relation to the other received uplinks from the same signal and also information about the quality of the different downlinks from the base stations. The downlink information is obtained from the measurement reports received from the mobile terminals. In this embodiment this information is sent to the base stations whenever there is a change in the importance of the branches. This could be done in a packet switched interface where information could be sent in a header of a packet even if there is no payload to be sent.

In this first embodiment each base station comprises, as shown in FIG. 3 in the first base station 3, a resource device 31 adapted to either decrease the transmission power for a specific branch or remove this specific branch and if necessary reallocate the code of the branch to a new connection when the base station experiences a decrease or a lack of resources. The resource device 31 comprises a receiving means 32, a deciding means 34 connected to the receiving means 32 and a power controlling means 36 connected to the deciding means 34. The receiving means 32 receives the information sent by the informing means 44 in the RNC 30. The deciding means 34 decides according to the information received in the receiving means 32 which downlinks that should be removed or be given less power if there is or is about to be a shortage of resources in the base station. The power controlling means 36 turns off or decreases the power according to the decision in case of a shortage of resources. The power controlling means 36 could also reallocate the code for the branch that has been removed to a new connection if there is or is about to be a lack of codes.

Figure 4:
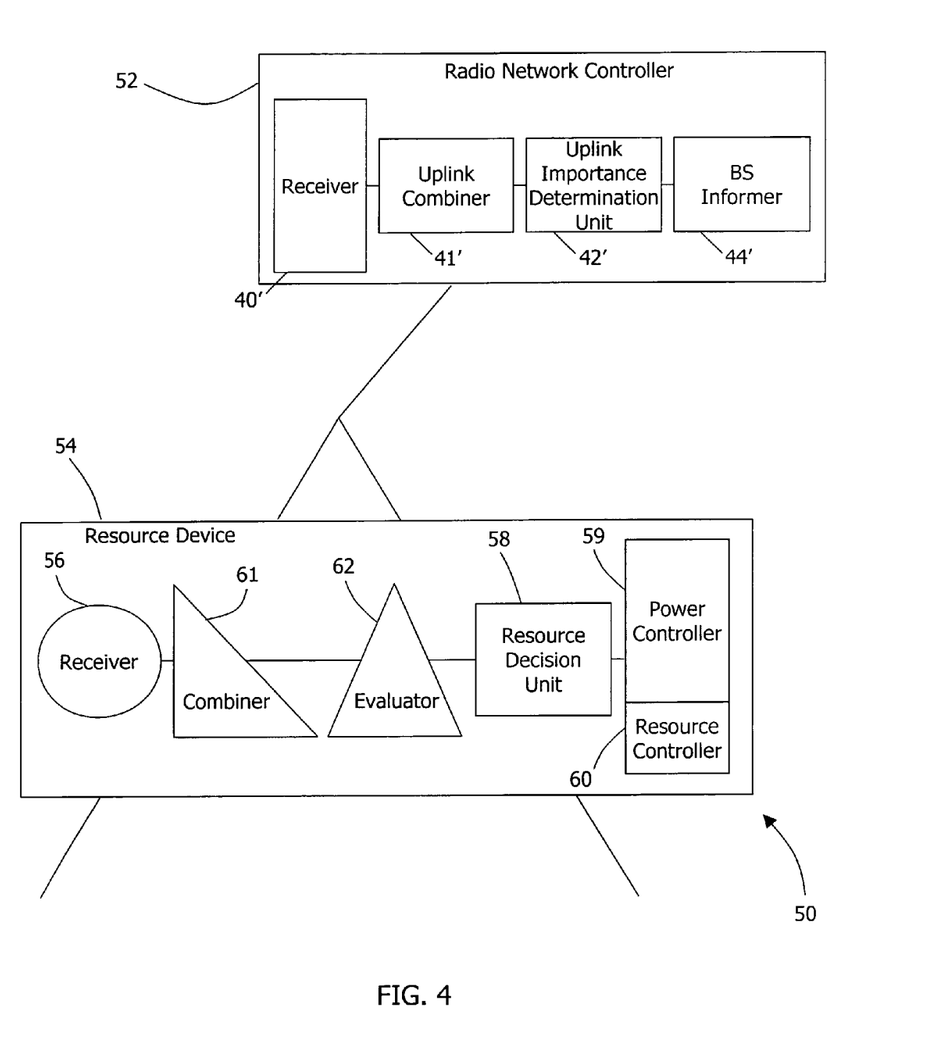
FIG. 4 illustrates a second embodiment of the invention.

In FIG. 4 a base station 50 connected to a node 52 in the network according to a second embodiment of the invention is shown. The node 52 is of the same kind as illustrated in FIG. 3. It comprises a receiving means 40', a deriving means 41' connected to the receiving means, a determination means 42' connected to the deriving means 41' and an informing means 44' connected to the determination means 42'. The functions of the means 40', 41', 42', 44' are the same as the functions of the means 40,41,42,44 in the first embodiment besides that in this embodiment the information about the quality of the uplinks and downlinks and information about the codes is sent from the node 52 to the base station as an answer every time data, such as voice or text, has been delivered from the base station 50 to the node 52. This implies that the base station 50 has to combine and evaluate the pieces of information by itself. For this purpose a resource device 54 is provided in the base station 50. It comprises a receiving means 56, a decision means 58 and a power controlling means 59 of the same kind as in the embodiment of FIG. 3. The power controlling means 59 is in this embodiment connected to a receiving resources controlling means 60 adapted for controlling the receiving resources in the base station. The resource device 54 comprises also a combining means 61 connected to the receiving means 56 and an evaluating means 62 connected to the combining means 61 and to the decision means 58. In the combining means 61 the information from the node 52 is combined and in the evaluating means 62 the information is evaluated before the decision means 58 decides what to do to save resources.

In this second embodiment the power controlling means 59 controls the power and the allocated codes as described in the first embodiment but it can also decrease the data rate for certain connections to save power.

These two embodiments are just two examples of embodiments. By combining the different possibilities described above in different ways a number of new embodiments is achieved.

What is claimed is:

1. A method of controlling resources to avoid congestion in a cellular radio system having at least one mobile terminal connectable to a network via at least one base station, said method comprising the steps of:
   receiving in each of a plurality of base stations, an uplink signal sent from the mobile terminal, wherein each base station receives the uplink signal with a different quality due to different uplink radio paths between the mobile terminal and each of the base stations;
   sending the received uplink signal from each base station to a network node;
   combining the plurality of uplink signals received at the network node to obtain a resulting signal corresponding to the uplink signal sent from the mobile terminal;
   determining an amount that each received uplink signal contributes to the resulting signal;
   determining whether there is a shortage or a projected shortage of resources to handle current or projected traffic demand in each base station; and
   if there is a shortage or a projected shortage of resources in a given base station:
      determining whether the uplink signal received by the given base station contributed a greater amount to the resulting signal than most of the other base station;
      if the uplink signal received by the given base station contributed a greater amount to the resulting signal than most of the other base stations, maintaining the allocation of resources to the downlink connection between the given base station and the mobile terminal; and
      if the uplink signal received by the given base station did not contribute a greater amount to the resulting signal than most of the other base stations, freeing resources from the downlink connection between the given base station and the mobile terminal.

2. The method of claim 1, wherein the step of freeing resources includes reducing transmit power on the downlink connection between the given base station and the mobile terminal.

3. The method of claim 1, wherein the step of freeing resources includes removing the downlink connection between the given base station and the mobile terminal.

4. The method of claim 3, wherein the step of freeing resources includes reallocating codes from the removed downlink connection between the given base station and the mobile terminal if there is a shortage or projected shortage of codes in the given base station.

5. The method of claim 4, wherein the network node informs the base station which codes utilized for downlink connections contribute the most to a resulting signal in the mobile terminal, and wherein the step of reallocating codes includes reallocating codes first to the downlink connections that contribute the most to the resulting signal in the mobile terminal.

6. The method of claim 1, further comprising controlling signal processing resources in each base station according to the determined amount that each base station's received uplink signal contributes to the resulting signal.

7. The method of claim 1, wherein the network node places information about the contribution of each received uplink signal in a header of a packet that is sent to the base station.

8. In a base station in a cellular radio network, a device for controlling radio resources to avoid congestion, said base station receiving a plurality of uplink signals from mobile terminals over a plurality of radio connections to the mobile terminals, and said base station reporting a signal quality level of each uplink signal to a node in the network, wherein a given uplink signal from a given mobile terminal is received by multiple base stations with differing signal quality levels, and is reported by the multiple base stations to the network node, said device comprising:
   means for receiving information from the network node regarding an amount that the given uplink signal reported by the base station contributes to a resulting total signal from the given mobile terminal;
   means for determining whether there is a shortage or a projected shortage of resources to handle current or projected traffic demand in the base station; and
   means responsive to a determination that there is a shortage or a projected shortage of radio resources, for freeing resources from the radio connection to the given mobile terminal if the uplink signal from the given mobile terminal does not contribute more than a predefined amount to the resulting total signal.

9. The device of claim 8, wherein the means for freeing resources includes means for reducing downlink transmit power on the connection to the given mobile terminal.

10. The device of claim 8, wherein the means for freeing resources includes means for removing the connection to the given mobile terminal.

11. The device of claim 10, wherein the means for freeing resources includes means for reallocating codes from the removed connection to the given mobile terminal if there is a shortage or projected shortage of codes in the base station.

12. The device of claim 11, wherein the network node includes means for informing the base station which codes utilized for downlink connections contribute the most to a resulting signal in the mobile terminal, and wherein the means for reallocating codes includes means for reallocating codes first to the downlink connections that contribute the most to the resulting signal in the mobile terminal.

13. The device of claim 8, further comprising means within the base station for controlling base station signal processing resources according to the contribution of each received uplink signal.

14. The device according to claim 8, wherein the node places information about the contribution of each received uplink signal in a header of a packet that is sent to the base station.

15. A mobile communication network that controls network resources to avoid congestion while communicating with at least one mobile terminal, said network comprising:
   a plurality of base stations, each of which includes means for receiving an uplink signal sent from the mobile terminal, wherein each base station receives the uplink signal with a different signal quality due to different uplink radio paths between the mobile terminal and each base station;
   a node connected to the plurality of base stations, said node including:

means for deriving from the different uplink signals received at the plurality of base stations, a resulting signal corresponding to the uplink signal sent from the mobile terminal;

means for determining an amount that each received uplink signal contributes to the resulting signal; and means for communicating the contribution of each received uplink signal to the plurality of base stations;

wherein each given base station also includes:

means for determining whether there is a shortage or a projected shortage of base station resources to handle current or projected traffic demand;

means, responsive to a determination that there is a shortage or a projected shortage of base station resources, for determining whether the uplink signal received by the given base station contributed a greater amount to the resulting signal than most of the other base station; and means, responsive to a determination that the uplink signal received by the given base station did not contribute a greater amount to the resulting signal than most of the other base stations, for freeing resources from the downlink connection between the given base station and the mobile terminal to avoid congestion.

16. A node in a cellular radio network for controlling network resources to avoid congestion, said node being connected to a plurality of base stations that communicate with at least one mobile terminal, said node comprising:

means for receiving from each of the plurality of base stations, an uplink signal received from a given mobile terminal, wherein each of the base stations reports the uplink signal to the node with a different signal quality due to different uplink radio paths between the mobile terminal and each base station;

means for deriving from the plurality of reports of the uplink signal, a resulting signal corresponding to the uplink signal sent from the given mobile terminal;

means for determining an amount that each received uplink signal contributes to the resulting signal; and means for sending to each base station, information regarding the contribution of the uplink signal reported by the base station;

wherein each base station utilizes the contribution information received from the node, and frees resources from downlink connections that do not contribute more than a predefined amount to the resulting signal to avoid congestion.

17. The node of claim 16, wherein the reported uplink signals from the base stations include information about pilot signal measurements made in a plurality of mobile terminals, and the node also includes:

means for determining a quality of each downlink radio link based on the pilot signal measurements; and means for determining which of the downlink radio links contribute more than a predefined amount to the determined quality of each downlink radio link;

wherein the means for sending contribution information to each base station also sends contribution information regarding the quality of each downlink radio link.

18. The node of claim 17, further comprising means for informing the base station which codes utilized for downlink radio links contribute the most to a resulting signal in the mobile terminal.

19. The node of claim 16, wherein the means for sending contribution information to each base station includes means for sending the contribution information in a header of a packet that is sent to each base station.

20. The node of claim 16, wherein the node is a Radio Network Controller.

* * * * *

UNITED STATES PATENT AND TRADEMARK OFFICE
CERTIFICATE OF CORRECTION

| | | |
|---|---|---|
| PATENT NO. | : 6,963,741 B2 | Page 1 of 1 |
| APPLICATION NO. | : 09/835229 | |
| DATED | : November 8, 2005 | |
| INVENTOR(S) | : Johansson et al. | |

It is certified that error appears in the above-identified patent and that said Letters Patent is hereby corrected as shown below:

In Column 9, Line 35, in Claim 1, delete "station" and insert -- stations --, therefor.

Signed and Sealed this

Twentieth Day of November, 2007

JON W. DUDAS
*Director of the United States Patent and Trademark Office*